(12) United States Patent
Vespasien et al.

(10) Patent No.: US 10,086,828 B2
(45) Date of Patent: Oct. 2, 2018

(54) METHOD FOR CONTROLLING THE STARTUP OF THE HEAT ENGINE OF A HYBRID POWER TRAIN

(71) Applicant: RENAULT s.a.s., Boulogne-Billancourt (FR)

(72) Inventors: Jean-Marie Vespasien, Choisy-le-Roi (FR); Maxime Debert, Versailles (FR); Ahmed Ketfi-Cherif, Elancourt (FR)

(73) Assignee: RENAULT s.a.s., Boulogne Billancourt (FR)

( * ) Notice: Subject to any disclaimer, the term of this patent is extended or adjusted under 35 U.S.C. 154(b) by 300 days.

(21) Appl. No.: 15/101,172

(22) PCT Filed: Nov. 17, 2014

(86) PCT No.: PCT/FR2014/052940
§ 371 (c)(1),
(2) Date: Jun. 2, 2016

(87) PCT Pub. No.: WO2015/082794
PCT Pub. Date: Jun. 11, 2015

(65) Prior Publication Data
US 2018/0178777 A1  Jun. 28, 2018

(30) Foreign Application Priority Data
Dec. 2, 2013 (FR) ..................... 13 61915

(51) Int. Cl.
*B60W 20/40* (2016.01)
*B60W 10/06* (2006.01)
(Continued)

(52) U.S. Cl.
CPC ............ *B60W 20/40* (2013.01); *B60W 10/06* (2013.01); *B60W 10/08* (2013.01); *B60W 20/13* (2016.01);
(Continued)

(58) Field of Classification Search
CPC ...... B60W 20/40; B60W 10/06; B60W 20/13; B60W 10/08; B60W 2710/0661;
(Continued)

(56) References Cited

U.S. PATENT DOCUMENTS 4,936,274 A * 6/1990 Kozlov ................. F02D 31/007
123/350
6,176,807 B1 * 1/2001 Oba ........................ B60K 6/365
180/65.25

(Continued)

FOREIGN PATENT DOCUMENTS

EP  2 557 010 A2  2/2013

OTHER PUBLICATIONS

International Search Report dated Mar. 4, 2015 in PCT/FR2014/052940 filed on Nov. 17, 2014.

(Continued)

*Primary Examiner* — Tyler J Lee
(74) *Attorney, Agent, or Firm* — Oblon, McClelland, Maier & Neustadt, L.L.P.

(57) ABSTRACT

A method controls the startup of a heat engine of a hybrid power train of a vehicle. The power train includes the heat engine and an electric drive machine, two concentric main shafts coupled one to the heat engine and one to the electric machine, at least one step-down gear of each of the main shafts on a secondary shaft connected to wheels of the vehicle, and a coupling of the two main shafts. The method includes coupling the two main shafts, inhibiting fuel injection of the heat engine, launching the heat engine by the electric machine, synchronizing a speed of the heat engine and a speed of the electric machine without fuel injection, activating the fuel injection and turning off the electric machine and decoupling the two main shafts.

10 Claims, 2 Drawing Sheets

Figure 1:
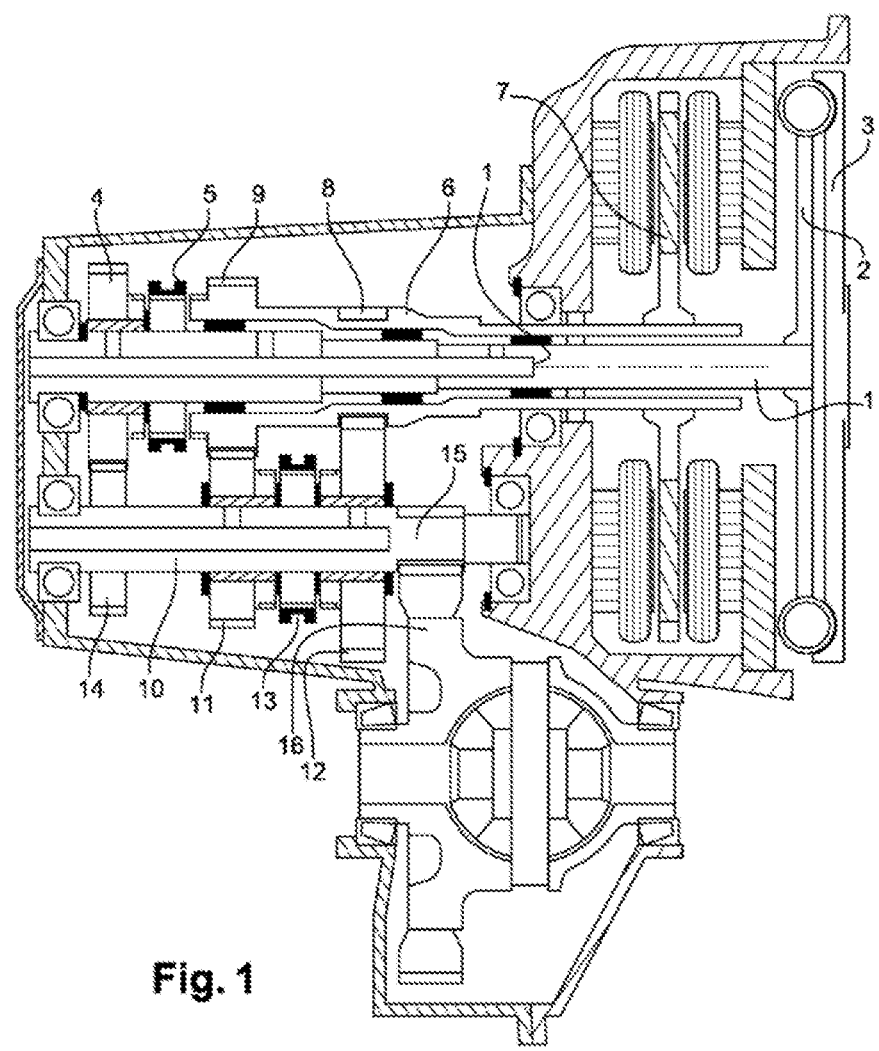

(51) Int. Cl.
  *B60W 10/08*     (2006.01)
  *B60W 20/13*     (2016.01)
(52) U.S. Cl.
  CPC .  *B60W 2510/244* (2013.01); *B60W 2710/065*
    (2013.01); *B60W 2710/0627* (2013.01); *B60W*
    *2710/0661* (2013.01); *B60W 2710/082*
    (2013.01); *Y10S 903/93* (2013.01)
(58) Field of Classification Search
  CPC ..... B60W 2710/065; B60W 2510/244; B60W
    2710/082; B60W 2710/0627; Y10S
    903/93
  USPC .......................................................... 701/22
  See application file for complete search history.

(56)     References Cited

U.S. PATENT DOCUMENTS 6,307,277 B1 *  10/2001  Tamai ..................... B60K 6/26
                                                 180/65.26
  6,342,027 B1    1/2002   Suzuki 2007/0157899 A1 *  7/2007  Seufert .................. B60K 6/387
                                                 123/179.25
  2008/0240941 A1 * 10/2008  Kumazaki ........... F16H 61/0031
                                                 417/309
  2010/0138086 A1 *  6/2010  Imamura ................ B60K 6/445
                                                 701/22
  2011/0320076 A1   12/2011  Shin
  2013/0040778 A1    2/2013  Schulte et al.
  2013/0109530 A1 *  5/2013  Kaltenbach ............ B60K 6/387
                                                 477/5
  2013/0184919 A1 *  7/2013  Kabe ...................... B60K 6/547
                                                 701/22
  2013/0245875 A1 *  9/2013  Imamura .................. B60K 6/44
                                                 701/22
  2014/0073478 A1 *  3/2014  Hashemi ............... F02D 41/042
                                                 477/5

OTHER PUBLICATIONS

French Preliminary Search Report dated Oct. 9, 2014 in Patent Application No. 1361915 filed on Dec. 2, 2013.

* cited by examiner

METHOD FOR CONTROLLING THE STARTUP OF THE HEAT ENGINE OF A HYBRID POWER TRAIN

The present invention relates to the field of hybrid transmissions for motor vehicles provided with a heat engine and an electric drive machine.

The invention relates to a method for controlling the startup, from standstill, of the heat engine of a hybrid power train comprising a heat engine and an electric drive machine, two concentric main shafts coupled one to the heat engine and one to the electric machine and each carrying at least one step-down gear on a secondary shaft connected to the wheels of the vehicle, and a means for coupling the two main shafts.

This invention can be applied, in a non-limiting manner, to a hybrid transmission as described in publication WO 2012/131259, comprising two concentric main shafts (1, 6) each carrying at least one step-down gear on a secondary shaft connected to the wheels of the vehicle, in which a first coupling means between the two main shafts can occupy three positions, in which:
- the heat engine is decoupled from the kinematic chain connecting the electric machine to the wheels,
- the heat engine drives the wheels independently of the electric machine,
- the heat engine and the electric machine are coupled so as to add each of their torques in the direction of the wheels.

In this transmission there are also three positions for directly connecting the main shaft coupled to the electric motor and the secondary shaft:
- the electric motor is not directly coupled to the secondary shaft,
- the electric motor is directly attached to the secondary shaft with a first ratio, and
- the electric motor is directly attached to the secondary shaft with a second ratio.

With current use of a vehicle provided with a power train of this type, the driver of the vehicle can be prompted to activate a hybrid mode requiring the startup of the heat engine, from standstill or when moving.

The analysis of the polluting emissions demonstrates the following fact: each time the heat engine is started up for the first time, the catalytic converter not yet being primed, the polluting emissions are such that, as a result, the standards relating to pollution reduction might not be observed over the entire certification cycle.

The object of the present invention is to overcome this disadvantage by reducing the polluting emissions associated with the startup of the heat engine, in particular when the catalytic converter thereof has not yet been primed.

With this objective, the invention proposes that the startup of the heat engine comprises the following steps:
- coupling the two main shafts,
- inhibiting the fuel injection of the heat engine,
- launching the heat engine by means of the electric machine,
- synchronizing the speed of the heat engine and of the electric machine,
- activating the fuel injection,
- turning off the electric machine and decoupling the two main shafts.

In accordance with the invention, the heat engine and the electric machine can be synchronized at the idle speed of the heat engine or at a speed greater than this.

Figure 2:
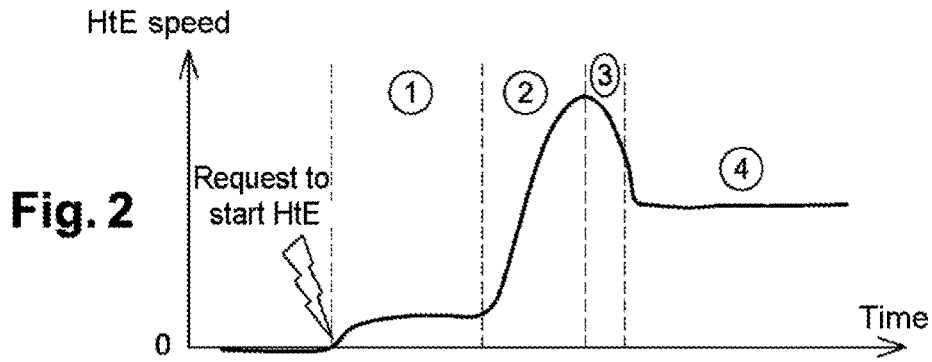
Figure 3:
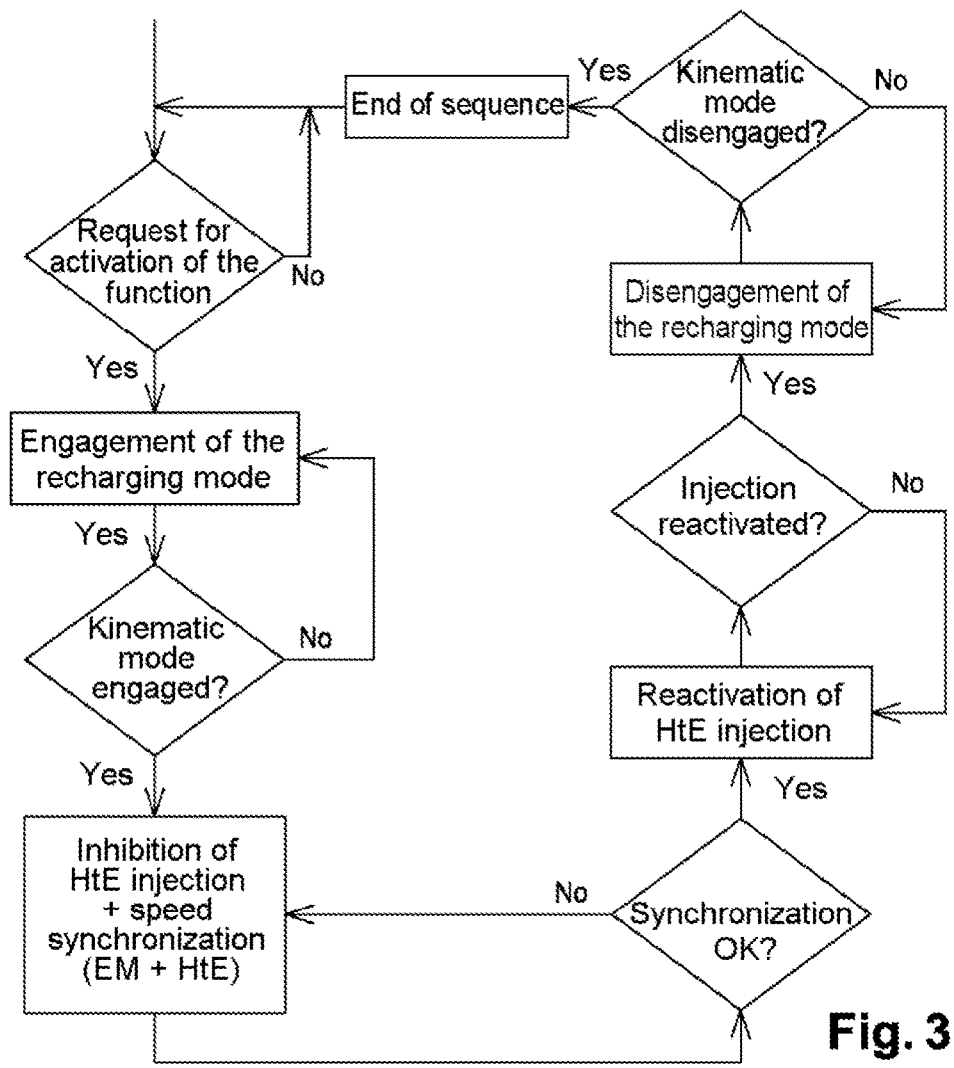

Further features and advantages of the present invention will be better understood by reading the following description of a non-limiting embodiment thereof and by referring to the accompanying drawings, in which:

FIG. 1 is a diagram of a hybrid transmission for implementing the invention, FIG. 2 illustrates the different phases of the startup of a heat engine with its starter, and FIG. 3 is a flow diagram illustrating the startup sequence proposed by the invention.

The hybrid power train (PT) of FIG. 1 comprises a heat engine 3, of which only the flywheel 2 has been shown, an electric drive machine 7, and two concentric main shafts 1, 6 coupled, respectively, to the heat engine 3 and to the electric machine 7. Each main shaft 1, 6 carries at least one step-down gear 4 and 8, 9 on a secondary shaft 10 connected to the wheels of the vehicle. The transmission is provided with a first coupling means 5 between the two main shafts 1, 6. The main gear 4 is an idle gear of the solid shaft 1, and the two main gears 8 and 9 are fixed gears of the hollow shaft 6. The two secondary gears 11 and 12 are idle gears, whereas the secondary gear 14 is a fixed gear. A second coupling means 13 makes it possible to connect one or other of the two gears 8, 9 to the secondary shaft 10. The references 15 and 16 denote, respectively, the step-down gear of the transmission 15 on the differential 16 thereof.

The first coupling means 5 between the two main shafts 1, 6 can occupy three positions, in which:
- the heat engine 3 is decoupled from the kinematic chain connecting the electric machine 7 to the wheels,
- the heat engine 3 drives the wheels independently of the electric machine 7, and
- the heat engine 3 and the electric machine 7 are coupled so as to add each of their torques in the direction of the wheels.

The second coupling means 13 can also occupy three positions, in which:
- the electric machine 7 is not directly coupled to the secondary shaft 10,
- the electric motor is directly connected to the secondary shaft 10 at a first ratio by the gear 12, and
- the electric motor is directly connected to the secondary shaft at a second ratio by the gear 11.

When the heat engine is started with the aid of a conventional starter, the detailed analysis of the polluting emissions demonstrates the fact that a subsequent injection of fuel is necessary in order to allow the heat engine to pass from the maximum speed of the starter to a speed allowing said heat engine to then be autonomous, with idle speed regulation. Figure 3 illustrates the different phases of a heat engine startup:
- phase 1: activation of the starter of the engine,
- phase 2: fuel injection to allow the engine to increase in speed,
- phase 3: interruption of injection in order to approach the target idle speed,
- phase 4: activation of the idle speed regulation (reactivation of the injection).

Vehicles are nowadays all provided with catalytic converters, reducing the polluting emissions in the event of normal operation. However, as indicated above, the polluting emissions are particularly significant each time the heat engine is started for the first time, because the catalytic converter has not yet been primed. It is precisely during the course of phase 2 that the engine releases unburnt combustion residues, because the catalyzer has not yet been primed.

The invention proposes carrying out phases 1 and 2 of the startup of the heat engine differently from FIG. 2 by means of a particular control, making it possible to reduce the polluting emissions, in particular in the case of startup from cold. Instead of using a starter separate from the electric drive machine, this is abandoned, and the heat engine is started with the electric machine. The startup sequence in these conditions comprises the following steps:

coupling the two main shafts,
inhibiting the fuel injection of the heat engine,
launching the heat engine by means of the electric machine,
synchronizing the speed of the heat engine and of the electric machine,
activating the fuel injection,
turning off the electric machine and decoupling the two main shafts.

The proposed sequence is particularly suitable for the engagement of the specific mode of "recharging at standstill" consisting of turning the electric machine into a generator by means of the heat engine in order to recharge the battery when the vehicle is stopped. The corresponding sequence is illustrated by FIG. 3. Following an activation request by the driver himself or herself, or by an autonomy safeguarding logic of the PT, the inhibition of the injection of the heat engine and the synchronization of the speeds are imposed as soon as the recharging kinematic mode is established. In the box of FIG. 1, the first coupler 5 thus connects the two main shafts in rotation (movement to the right with respect to the figure) and the second coupler 13 is open (position shown). The heat engine and the electric machine can be synchronized at the idle speed of the heat engine or at a speed greater than this. When the synchronization is OK, the injection is reactivated. The sequence finishes when the kinematic mode is disengaged. The inhibition of the injection and the synchronization of speed are preferably simultaneous. Lastly, it is advantageous for the flow of injected fuel to be brought directly to its idle flow rate, with no intermediate starting peak.

The sequence of FIG. 3 is particularly suitable for recharging the batteries of the vehicle at standstill over the PT of FIG. 1. However, if the launching of the heat engine is authorized during travel, the intervention can extend to other situations. Without departing from the scope of the invention, it may be appropriate to introduce battery recharging modes during travel (although this is then accompanied by an interruption of transitory motivity, which might be perceived disadvantageously inside the vehicle), where to pass from purely electric driving modes into hybrid modes, in which the heat engine must be started in order to add the power contribution thereof to that of the electric machine.

In conclusion, it should be noted that the proposed solution does not require any specific equipment, and simply requires the particular control of the hybrid PT in order to start the heat engine. The benefits of this are numerous:

on lowering pollution: reduction of the polluting emissions, because the rise in speed of the heat engine is implemented without combustion of fuel,
on acoustics, because the starter of the heat engine is not engaged, and
on agreeableness: by engaging the electric traction machine in order to assure the startup of the heat engine, the startup time is reduced, because the performances of the electric drive machine are superior to those of a starter.

The primary benefit of the solution is therefore to enable an initial startup from standstill of the heat engine, in particular for activation of a recharging of the battery at standstill. In fact, once the catalytic converter has been primed, the following startups (under starter) are correctly cleared of pollution. The use of this solution for any initial startup of the heat engine over a driving cycle can thus be retained beyond the battery recharging mode, for example in order to engage a hybrid mode. Since it is quieter, quicker and less polluting than conventional startup with the starter, the proposed startup mode, however, can be used after the initial startup, in particular when the vehicle is stopped, by application of particular strategies, such as:

a strategy of activation of the catalyzer consisting of heating the catalyzer so as to prime it, such that it is able to assure its function of clearing pollution, or
a strategy of preservation of the level of charge of the battery, when this becomes critical.

The invention claimed is:

1. A method for controlling startup of a heat engine of a hybrid power train of a vehicle comprising the heat engine and an electric drive machine, two concentric main shafts coupled one to the heat engine and one to the electric machine, at least one step-down gear of each of the main shafts on a secondary shaft connected to wheels of the vehicle, and means for coupling the two main shafts, the method comprising:

coupling the two main shafts;
inhibiting fuel injection of the heat engine;
launching the heat engine by the electric machine;
synchronizing a speed of the heat engine and a speed of the electric machine without fuel injection;
activating the fuel injection; and
turning off the electric machine and decoupling the two main shafts.

2. The control method as claimed in claim 1, wherein the heat engine and the electric machine are synchronized at an idle speed of the heat engine.

3. The control method as claimed in claim 1, wherein the heat engine and the electric machine are synchronized at a speed greater than an idle speed of the heat engine.

4. The control method as claimed in claim 1, wherein the synchronizing and the inhibiting are simultaneous.

5. The control method as claimed in claim 1, wherein a flow of injected fuel is brought directly to an idle flow rate with no intermediate starting peak.

6. The control method as claimed in claim 1, wherein the method intervenes when a kinematic recharging mode at standstill of batteries of the vehicle is activated, in which the heat engine turns the electric drive machine into a generator.

7. The control method as claimed in claim 6, wherein the kinematic recharging mode is engaged when the means for coupling connects the two main shafts.

8. The control method as claimed in claim 6, wherein the kinematic recharging mode is a recharging mode at standstill.

9. The control method as claimed in claim 1, wherein the method intervenes in event of a transition between an electric mode, in which the electric machine assures only a drive of the vehicle, and a hybrid mode requiring startup of the heat engine to add a power contribution thereof to that of the electric machine.

10. The control method as claimed claim 6, wherein the method is reserved for an initial startup of the heat engine during a driving cycle.

* * * * *